United States Patent
Chen (10) Patent No.: US 8,746,920 B2
(45) Date of Patent: Jun. 10, 2014

(54) OPTICAL PACKAGE AND A TORCH HAVING THE OPTICAL PACKAGE

(75) Inventor: Jin Chen, Guangdong (CN)

(73) Assignee: Max Lux Corp., Ltd., Guangdong (CN)

( * ) Notice: Subject to any disclaimer, the term of this patent is extended or adjusted under 35 U.S.C. 154(b) by 205 days.

(21) Appl. No.: 13/329,911

(22) Filed: Dec. 19, 2011

(65) Prior Publication Data

US 2013/0027922 A1    Jan. 31, 2013

(30) Foreign Application Priority Data

Jul. 25, 2011    (CN) ...................... 2011 2 0264728 U (51) Int. Cl.
*F21V 14/00* (2006.01)
*F21V 14/06* (2006.01)
*F21V 19/02* (2006.01)

(52) U.S. Cl.
USPC ........................... 362/188; 362/187; 362/319

(58) Field of Classification Search
USPC ......... 362/309, 308, 310, 326–350, 187–188, 362/319, 282–284
See application file for complete search history.

(56) References Cited

U.S. PATENT DOCUMENTS

| | | | |
|---|---|---|---|
| 6,296,376 B1 * | 10/2001 | Kondo et al. | 362/310 |
| 6,598,993 B1 * | 7/2003 | Dalton et al. | 362/188 |
| 7,473,007 B1 * | 1/2009 | Wang | 362/187 |
| 8,485,683 B2 * | 7/2013 | Popper et al. | 362/188 |
| 2011/0063824 A1 * | 3/2011 | Qiu | 362/188 |
| 2011/0080725 A1 * | 4/2011 | Brands et al. | 362/187 |
| 2012/0020062 A1 * | 1/2012 | Opolka | 362/187 |

* cited by examiner

*Primary Examiner* — Mariceli Santiago
(74) *Attorney, Agent, or Firm* — Kratz, Quintos & Hanson, LLP (57) ABSTRACT

The present utility model discloses an improved optical package which includes a light source, an installation socket, a mirror and a convex lens, wherein at least one part of the projection of the reflection surface of the mirror on its axial section is in a parabolic shape, and the axes of the mirror and the convex lens share the same line. The installation socket can move along the axial direction of the convex lens and an installation depression is set at the front end of the installation socket, wherein the light source is configured in the installation depression, the emitting point of the light source is on the axis of the convex lens and the circumference of the installation depression is formed to be a reflection surface capable of reflecting the light emitting from the bottom of the light source.

21 Claims, 9 Drawing Sheets

OPTICAL PACKAGE AND A TORCH HAVING THE OPTICAL PACKAGE

BACKGROUND OF THE INVENTION

1. Technical Field

The present utility model relates to the technical field of optics, and more specifically, to an improved optical package and an illumination torch using the optical package.

2. Description of Related Art

The traditional incandescent or LED torches are composed of a parabolic concave mirror and an incandescent or LED light source set at the focus of the concave mirror. The light in the middle of or near the light source will be given off in a straight line, thus causing the unavailability of the effective light use since the light reflected from the middle is not strong enough and cannot realize long-distance illumination with great light loss.

There are some torches using a mirror with a double or single concave refection surface, but in a limited application space, the light at both ends is used ineffectively, the parallel light emitted from the middle is not strong enough, thus long-distance illumination cannot be realized ideally and only short-distance illumination is realized without light loss reduction.

The traditional torches are composed of a bulb, a lamp holder, a parabolic concave mirror and batteries. The bulb is used as a light source from which the light is emitted from the inner chamber of the mirror; the batteries are used to provide electrical energy for the bulb, wherein the sleeve head part at the front end of the lamp holder is capable of rotating relatively to the main body of the lamp holder, the mirror is fixed inside the sleeve head part, and the bulb is connected at the front end of the lamp holder. The sleeve head part is assembled with the main body of the lamp holder by means of threads. When the sleeve head part rotates relatively to the main body of the lamp holder, the axial distance between them can be changed, thus the bulb position in the axial direction of the mirror can be changed. Therefore, when the bulb moves along the axial line of the mirror, the light emitted by it is given off from the front end of the torch after being reflected by the mirror and can generate various different shadows.

The existing torches have the following using defects since they use the structure above:

1. A large proportion of the light emitted by the light source cannot be reflected by the mirror directly but is given off from the upper circumference of the mirror directly. The light cannot be processed by the mirror to gather light; it will become useless light after being given off from the upper circumference of the mirror, which cannot be used for illumination. Therefore, the existing torches above cannot make full use of the light emitted by the light source and the light loss is great.

2. Since the existing torches cannot emit parallel light and have great light loss when gathering light, the luminance of light emitted is low, and the illumination distance is short.

3. Since the LED light-emitting angle of the existing torches exceeds the outer diameter of the lens during flood lighting, causing the unavailability of the effective use of the light exceeding the outer diameter, the luminance of light emitted is low, and the illumination distance is short.

BRIEF SUMMARY OF THE INVENTION

With respect to the defects of the prior art, one objective of the present utility model is to provide an optical package capable of reducing light loss effectively.

Another objective of the present utility model is to provide a torch using the optical package above.

To realize the first objective above, the present utility model adopts the following technical solution:

An improved optical package, including a light source, an installation socket, a mirror and a convex lens, wherein at least one part of the projection of the reflection surface of the mirror on its axial section is in a parabolic shape, the axes of the mirror and the convex lens share the same line; an installation depression is set at the front end of the optical package, wherein the light source is configured in the installation depression, the emitting point of the light source is on the axis of the convex lens and the circumference of the installation depression is formed to be a reflection surface capable of reflecting the light emitting from the bottom of the light source.

The installation socket can move along the axial direction of the convex lens.

The light source is a point light source. The focuses of the convex lens and the mirror coincide with each other. When the installation socket moves to the maximum space of the convex lens, the emitting point of the light source and the focus of the mirror coincide with each other.

The light source is a surface light source. The focuses of the convex lens and the mirror have a horizontal offset distance no greater than 1 mm.

The reflection surface is a slant or at least one part of the projection of the reflection surface on the axial section of the mirror is in a parabolic shape.

The top end of the light source is on the inner side of the outer end surface of the installation socket, or the top end of the light source is at the same level with the outer end surface of the installation socket.

The light source is an LED light, and a through hole fit for the bottom of the LED light is installed at the bottom of the installation socket on the inner side, wherein the axes of the through hole and the convex lens share the same line.

A light-penetrable support integrated with the convex lens is configured between the outer circumference of the convex lens and the upper end part of the mirror.

The upper surface and/or lower surface of the support are/is in arc shape.

A light-penetrable connecting plate is integrated between the circumference of the convex lens and the support.

The support is a conical canister, wherein the angle between the two sides of its cross section is greater than 85 degrees and the angle between the extensive direction of the support and the cross section of the convex lens is 30-50 degrees.

A light-penetrable support canister is connected between the circumference of the convex lens and the lower end part of the mirror, wherein the support canister is integrated with the convex lens.

The refection surface of the mirror has a step, wherein the projections of the refection surface on the axial section of the mirror on the two sides of the step are in a parabolic shape.

The light incident surface of the convex lens is a Fresnel surface.

The positions of the convex lens and mirror are relatively fixed.

The convex lens can move relative to the mirror along its axial direction.

To realize the second objective above, the present utility model adopts the following technical solution:

A torch having the optical package above, including a light source, an installation socket, a mirror, a convex lens, a light holder and a sleeve head part, wherein at least one part of the projection of the reflection surface of the mirror on its axial section is in a parabolic shape, the axes of the mirror and the convex lens share the same line. The installation socket can move along the axial direction of the convex lens and an installation depression is set at the front end of the optical package, wherein the light source is configured in the installation depression, the emitting point of the light source is on the axis of the convex lens and the circumference of the installation depression is formed to be a reflection surface capable of reflecting the light emitting from the bottom of the light source. The sleeve head part is sleeved at the front end of the light holder and can slide along the axial direction of the light holder, the mirror and the convex lens are installed inside the sleeve head part and the installation socket is fixed and connected with the front end of the light holder.

A limit sliding groove is configured on the inner surface of the sleeve head in its axial direction, wherein the inner side of the limit sliding groove is a dead end and an elastic fastener fit for the limit sliding groove is configured at the circumference of the installation socket.

The elastic fastener includes an elastic connecting section extending from the circumference of the installation socket, and a limit flange integrated at the outer circumference of the free end of the elastic connecting section, wherein a limit block is set between the elastic connecting section and the installation socket.

A limit plate is mounted on the installation socket and the free end of the elastic connecting section is limited between the limit block and the main body of the installation socket.

To realize the second objective above, the present utility model also adopts the following technical solution:

A torch having the optical package above, including a light source, an installation socket, a mirror, a convex lens, a light holder and a sleeve head part, wherein at least one part of the projection of the reflection surface of the mirror on its axial section is in a parabolic shape, the axes of the mirror and the convex lens share the same line. The installation socket can move along the axial direction of the convex lens and an installation depression is set at the front end of the optical package, wherein the light source is configured in the installation depression, the emitting point of the light source is on the axis of the convex lens and the circumference of the installation depression is formed to be a reflection surface capable of reflecting the light emitting from the bottom of the light source. The outer surface of the light holder is provided with external threads at the front end, and the inner surface of the sleeve head part is provided with internal threads fit for the external threads, wherein the mirror and the convex lens are mounted in the sleeve head part and the installation socket is fixed and connected with the front end of the light holder.

The favorable effects of the present utility model are:

The optical package of the present utility model can make full use of the light emitted by the light source, thus reducing light loss effectively and realizing long-distance illumination. Moreover, the torch using the optical package of the present utility model can realize rapid shadow conversion and conveniently lock the product in any state during tension according to requirements, in this way avoiding moving the originally-set best luminous efficiency position due to extrusion of external forces; according to test data, the light loss of the optical package of the present utility model can be reduced to less than 12%.

DETAILED DESCRIPTION OF THE INVENTION

The present utility model will be detailed hereinafter in conjunction with the accompanying drawings and embodiments.

Figure 1:
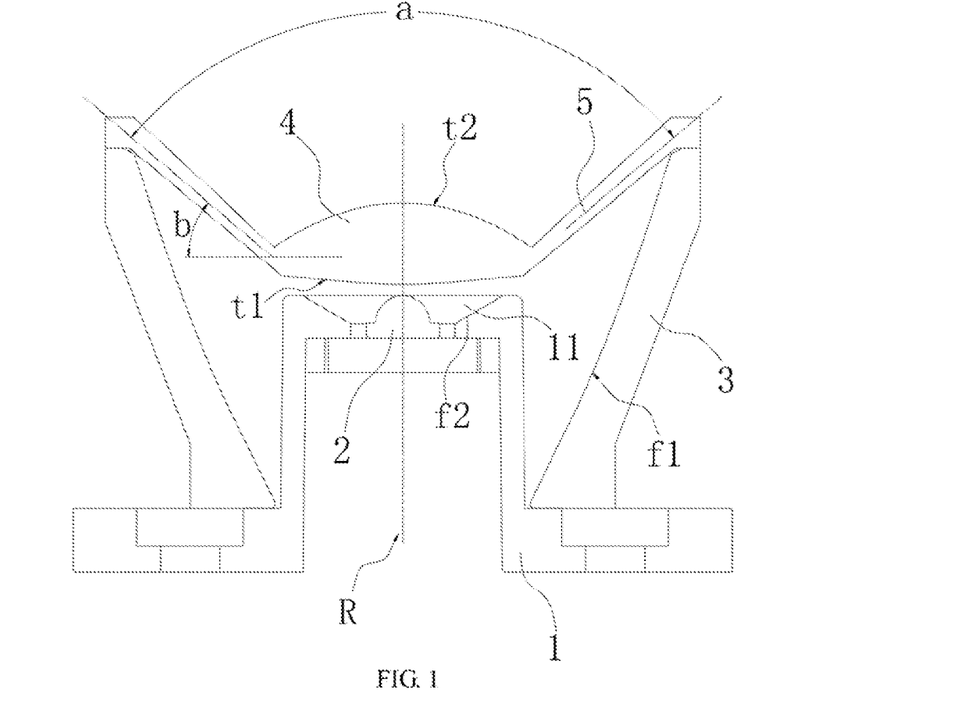
FIG. 1 is the structural diagram of an optical package of the present utility model.

FIG. 1 shows an improved optical package of the present utility model, including an installation socket 1, a light source 2, a mirror 3, a convex lens 4, wherein the mirror 3 is in bowel shape with openings at both the upper and lower parts, the outer circumference of the convex lens 4 in the upper opening of the mirror 3 is fixed and connected on the inner side of the upper opening of the mirror 3 which has a support 5, a transparent plate structure; the installation socket 1 is in the lower opening of the mirror 3 and the light source 2 is fixed at the upper end of the installation socket 1. The mirror 2 is a parabolic mirror, and more specifically, the projection of the reflection surface f1 of the mirror 3 on its axial section is in parabolic shape and the axes of the convex lens 4 and the mirror 3 share the same line R shown in the figure. In addition, the focuses of the convex lens 4 and the mirror 3 coincide with each other. The central axis of the installation socket 1 coincides with the axis R and the installation socket 1 can move relatively to the mirror 3. The light source 2 whose light emitting point is on the axis R is installed in the installation depression 11 configured at the upper end surface of the installation socket 1. The circumference of the installation depression 11 is machined to a reflection surface f2, wherein the reflection surface f2 can be a slant or a parabolic reflection surface (that is to say, the projection of the reflection surface f2 on the axial section of the mirror 3 is in parabolic shape); in order to obtain good luminous efficiency, the support 5 above is a conical canister structure, wherein the two ends of its axial section form an angle a greater than 85 degrees. According to the test data of the inventor, the luminous efficiency is the best when the angle a is 94 degrees. An angle b is generated between the extensive direction of the support 5 and the cross section of the convex lens 4, wherein the angle b is 30 to 50 degrees, and 40 degrees preferably. Since the reflection surface f2 above has a certain opening degree, the part at the front end of the installation socket 1 used to install the light source 2 is required to have a certain diameter which determines the diameter of the lower opening of the mirror 3. Therefore, the diameter of the lower opening of the mirror 3 above shall be no smaller than 6 mm so as to ensure that the diameter of the front end of the installation socket 1 is no smaller than 6 mm, thus enabling the reflection surface f2 to have suitable opening degree. Moreover, the optical package can be machined to difference sizes; specifically, the height can be 5-70 mm. The proportion of the maximum diameter of the optical package relative to its height is within 1:0.8 to 1:0.5. According to the optical test results of the inventor, under the condition that all the other conditions are the same, the luminous efficiency generated is the best when the proportion of the maximum diameter of the optical package relative to its height is 1:0.65. The proportion of the diameter of the convex lens 4 relative to that of the upper end part of the mirror 3 above is within 1:0.5 to 1:0.3, and 1:0.4 preferably.

If the light source 2 above can be a point light source, the focuses of the convex lens 4 and the mirror 3 above coincide with each other. When the installation socket 1 leads the light source 2 to move to the maximum space to the convex lens 4, the light emitting point of the light source 2 coincides with the focuses of the convex lens 4 and the mirror 3. If the light source above is a surface light source (such as an LED light), a deviation between the focuses of the convex lens 4 and the mirror 3 within 1 mm in the horizontal direction is allowed to exist in the direction vertical to the axis R, wherein the specific size of the deviation is determined by the size of the light emitting area or the light emitting chip of the LED light.

The light source above uses an LED light. A through hole fit for the bottom of the LED light is machined at the bottom on the inner side of the installation depression 11, so it can fit for the installation of the LED light. Moreover, in order to ensure the coaxiality of the LED light with the convex lens 4 and the mirror 3, the colinerity of axes of the through hole and the convex lens 4 shall be ensured in advance.

Figure 3:
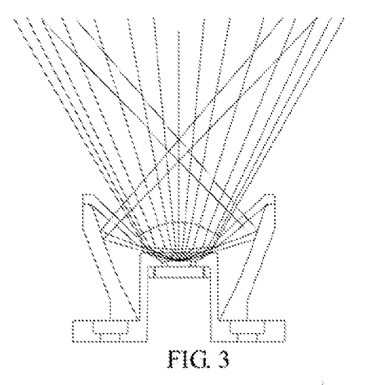
FIG. 3 is the schematic diagram of a using state of the optical package shown in FIG. 1.

As shown in FIG. 3, the installation socket 1 leads the light source 2 to move along the axis R relative to the mirror 3. When the light source 2 moves to a place nearest to the convex lens 4, the light emitted by the light source 2 will be given off after being reflected by the mirror 3 and refracted by the support 5, while the light in the middle will be given off after being refracted by the convex lens 4 directly and the light at the extreme edge (namely the light forming the maximum angle with the axis R) will be given off after being reflected by the reflection surface f2 at the circumference of the installation depression 11 and refracted by the support 5, thus making full use of the light emitted by the light source 2. Since the light source 2 is nearest to the convex lens 4, the image generated after the light is emitted from the optical package is a maximum aperture, by name commonly referred to as a flood light. In the structure above, the upper top of the light source 2 is on the inner side of the outer end surface of the installation depression 11 or at the same level with the outer end surface of the installation depression 11, thus avoiding the collision between the light source 2 and the inner surface of the convex lens 4 during the movement relative to the convex lens 4 as well as ensuring the sufficient movement range of the light source 2.

Figure 4:
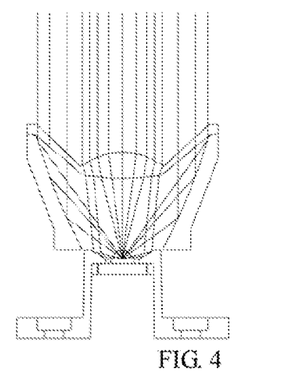
FIG. 4 is the schematic diagram of another using state of the optical package shown in FIG. 1.

The inventor has set the axial dimensions of the structures above. The maximum displacement of the movement keeping the light source 2 far away from the convex lens 4 can only ensure that the light emitting point of the light source 2 coincides with the focuses of the convex lens 4 and the mirror 3, that is to say, when the light source 2 moves far away from the convex lens 4 until the light emitting point of the light source 2 coincides with the focus of the convex lens 4, the light source 2 cannot move relatively to the convex lens 4, namely the state shown in FIG. 4. In this state, the light at the circumference becomes parallel light after being reflected by the mirror 3 and refracted by the support 5, and the light in the middle becomes parallel light after being refracted by the convex lens 4, in this way, all the lights emitted from the optical package become parallel light; in this state, all the light emitted by the light sources 2 are gathered and the light generated by the whole optical package can form a clear image in a long distance.

As shown in FIG. 1, in order to realize a better effect, the inventor limits the curvatures t1 and t2 of the light incident surface and emergent surface of the convex lens 4 above within 0.0001-0.2569 mm and 0.0648-0.2169 mm respectively.

Figure 2:
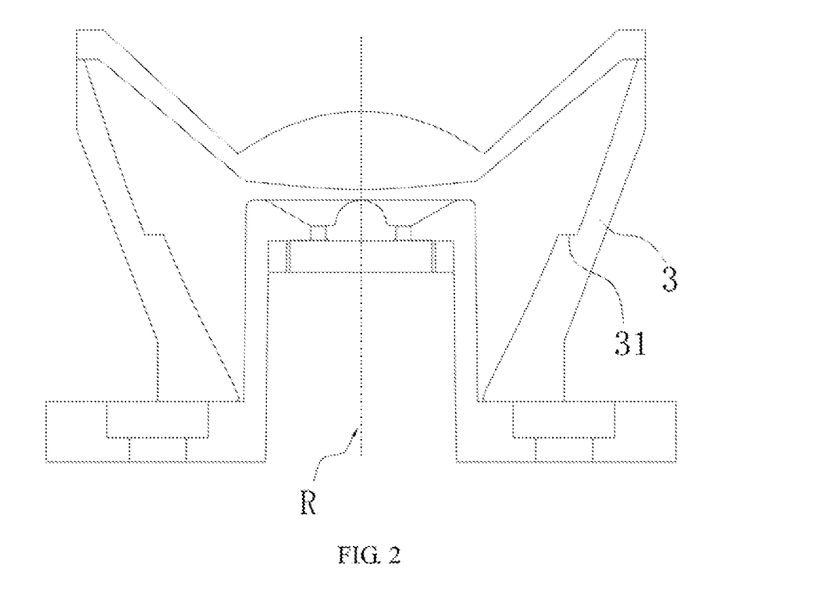
FIG. 2 is a modified structure of the optical package shown in FIG. 1.

As shown in FIG. 2, the structure of the optical package shown in FIG. 1 can be optimized, a step 31 is machined on the reflection surface of the mirror 3 above, wherein the upper and lower parts of the step 31 are in parabolic shape; this structure is suitable for the situation that the light source is a line light source, and more specifically, a certain space exists between the focuses of the parabolic reflection surfaces of the upper and lower parts of the step 31 above on the axis of the mirror 3, thus good parallel luminous efficiency can be obtained.

Figure 8:
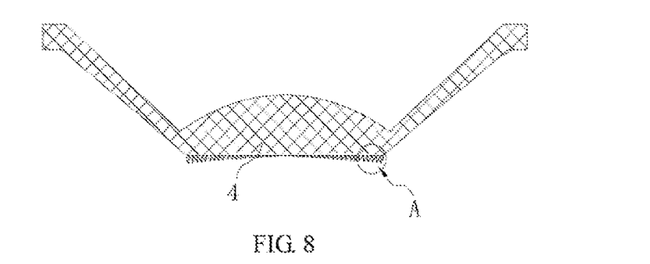
FIG. 8 is another modified structure of the optical package shown in FIG. 1.
Figure 9:
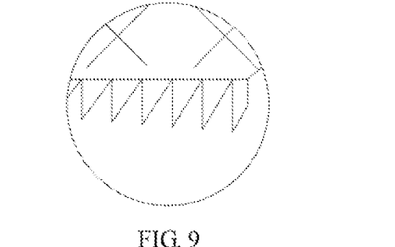
FIG. 9 is the magnified diagram of A in FIG. 8.

As shown in FIG. 8 and FIG. 9, the lower surface of the convex lens 4 above can be machined to a Fresnel surface. Since the light emergent surface of the convex lens 4 is machined to a Fresnel surface (wave shape) by removing the part having no direct effect on the light of the light incident surface of the convex lens 4, the distance of the light going through the convex lens 4 is reduced, thus increasing the transmittance of the convex lens 4 and reducing the light loss.

Figure 10:
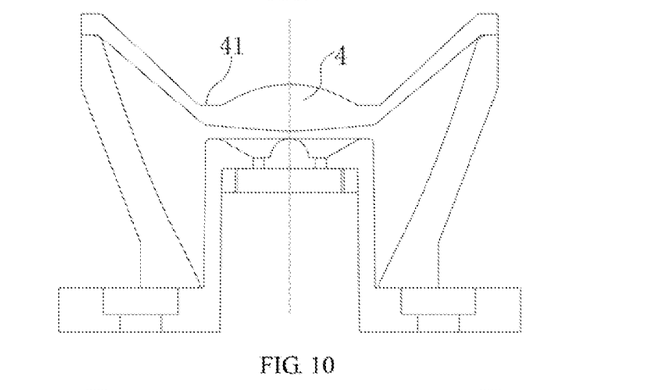
FIG. 10 is another modified structure of the optical package shown in FIG. 1.
Figure 11:
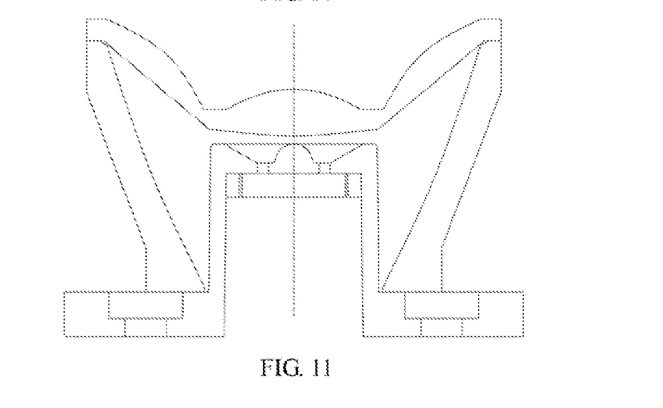
FIG. 11 is another modified structure of the optical package shown in FIG. 10.

Moreover, as shown in FIG. 10, a flat and straight connecting plate 41 penetrable to light is mounted between the circumference of the convex lens 4 and the support 5, wherein the connecting plate 41 is integrated with the convex lens 4 and the support 5 and is used as a buffer section between the convex lens 4 and the support 5 during injection molding for the convenience of glue feeding and drawing of patterns. In order to realize better light-gathering effect, as shown in FIG. 11, the upper surface of the support 5 above can be machined to an arc-shaped surface, and more specifically, by increasing the thickness from the two sides to the middle, which is equivalent to a light-gathering lens. It is certain that the lower surface of the support 5 can also be machined to the convex arc-shaped surface, or both the upper and lower surfaces of the support 5 are machined to the convex arc-shaped surfaces above.

Figure 5:
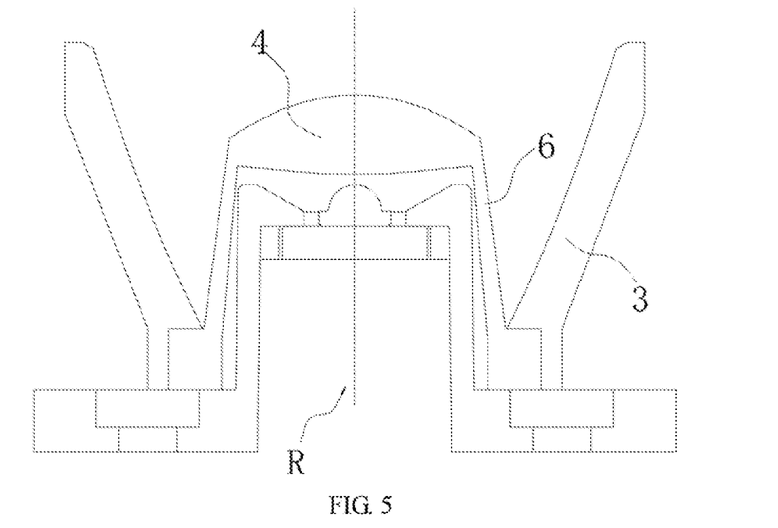
FIG. 5 is the structural diagram of another optical package of the present utility model.
Figure 6:
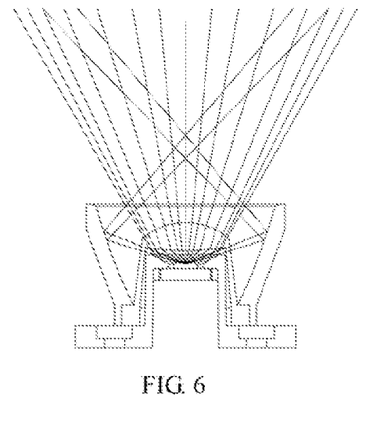
FIG. 6 is the schematic diagram of a using state of the optical package shown in FIG. 5.
Figure 7:
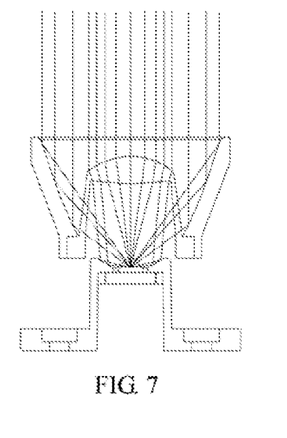
FIG. 7 is the schematic diagram of another using state of the optical package shown in FIG. 5.

FIG. 5 shows another optical package of the present utility model. What is different from the abovementioned is that, the structure used to connect and support the convex lens 4 and the mirror 3 is a support canister 6, wherein the support canister 6 made of light-penetrable materials is integrated at the lower part of the circumference of the convex lens 4, and its lower end part is fixed and connected with the inner circumference of the lower opening of the mirror 3. In order to reduce light loss, the back end of the support canister 6 above narrows down from the upper part to the lower part in turn. The using situations of the optical package shown in FIG. 6 and FIG. 7 are approximately the same with the optical package above, and will not be detailed herein.

The mirror part of the optical package above is composed of aluminum alloy or plastic, preferably PC, PMMA or glass, and shall be provided with high-quality surface finish (such as vacuum coating) so as to improve the light-reflection capacity of the mirror surface; the convex lens part shall be made of plastic, preferably PMMA or glass.

Figure 12:
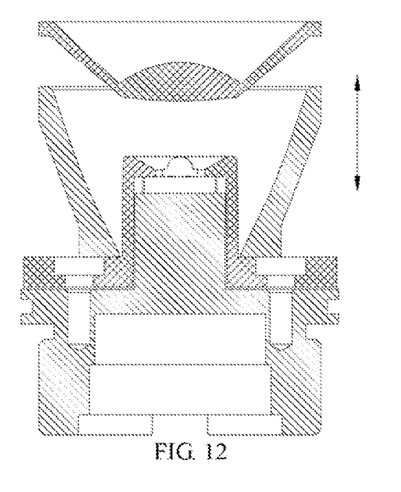
FIG. 12 is the structural diagram of the optical package of the present utility model whose convex lens is capable of moving relatively to the mirror.

The convex lens 4 and the mirror 3 of the optical package above of the present utility model are relatively fixed, that is to say, no relative displacement occurs between them. It is certain that, in some application fields, the present utility model can also provide the structure shown in FIG. 12, wherein the convex lens can move along the mirror in its axial direction, namely the axial displacement between them can be changed, so the shadow can be changed by changing the displacement and converting the light path; in this optical package, the mirror can be fixed as described above to let the convex lens move relative to the mirror, or the convex lens can be fixed to let the mirror move relatively to the convex lens.

Moreover, to realize single function, the positions of the installation socket 1, mirror 3 and convex lens 4 can be fixed, namely the axial positions of the mirror 3, convex lens 4 and installation socket 1 can be fixed. However, this configuration is required to set the axial distance between the installation socket 1 and the convex lens 4 according to the application requirements, for example, when gathering light, the distance between the installation socket 1 and the convex lens 4 is required to be set correspondingly to let the light source 2 on the focuses of the mirror 3 and the convex lens 4, then the installation socket 1 shall be fixed and connected with the lower end part of the mirror 3 and the convex lens shall be fixed on the mirror 3. To realize flood lighting effect, the distance between the installation socket 1 and the convex lens 4 shall be set to enable the light source 2 to be close to the convex lens 4 if possible.

Figure 13:
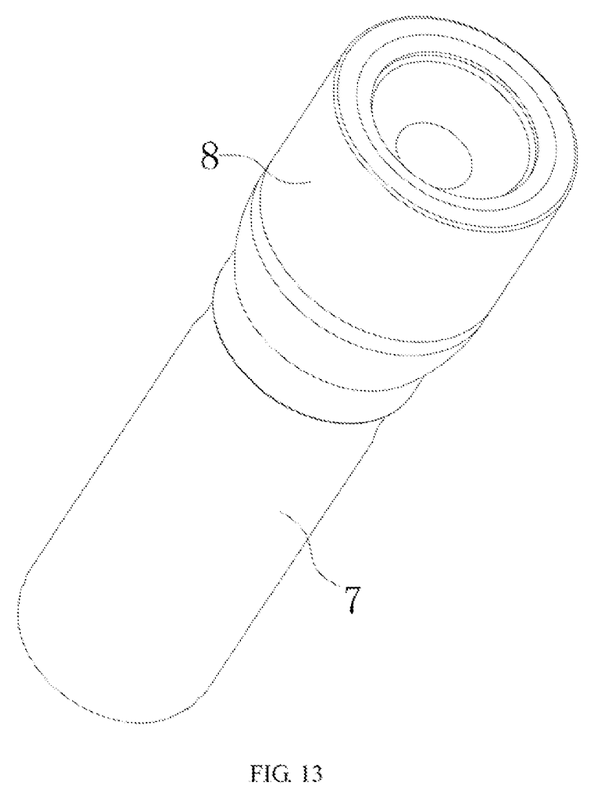
FIG. 13 is the structural diagram of a torch of the present utility model.
Figure 14:
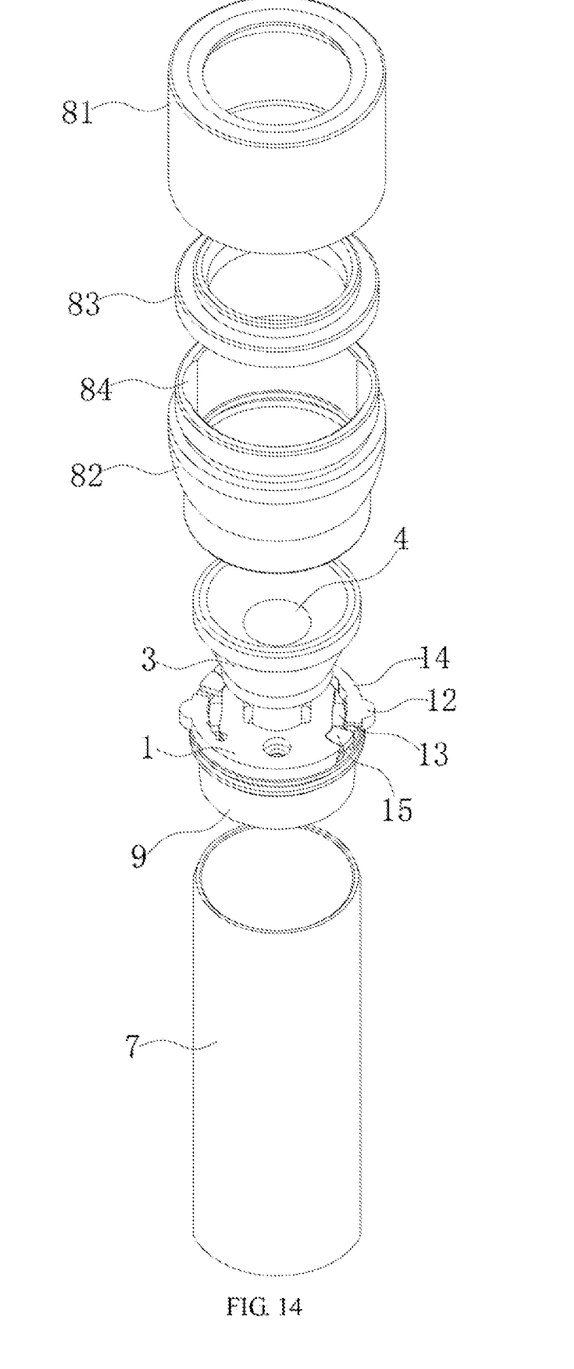
FIG. 14 is the installation diagram of the torch shown in FIG. 13.
Figure 15:
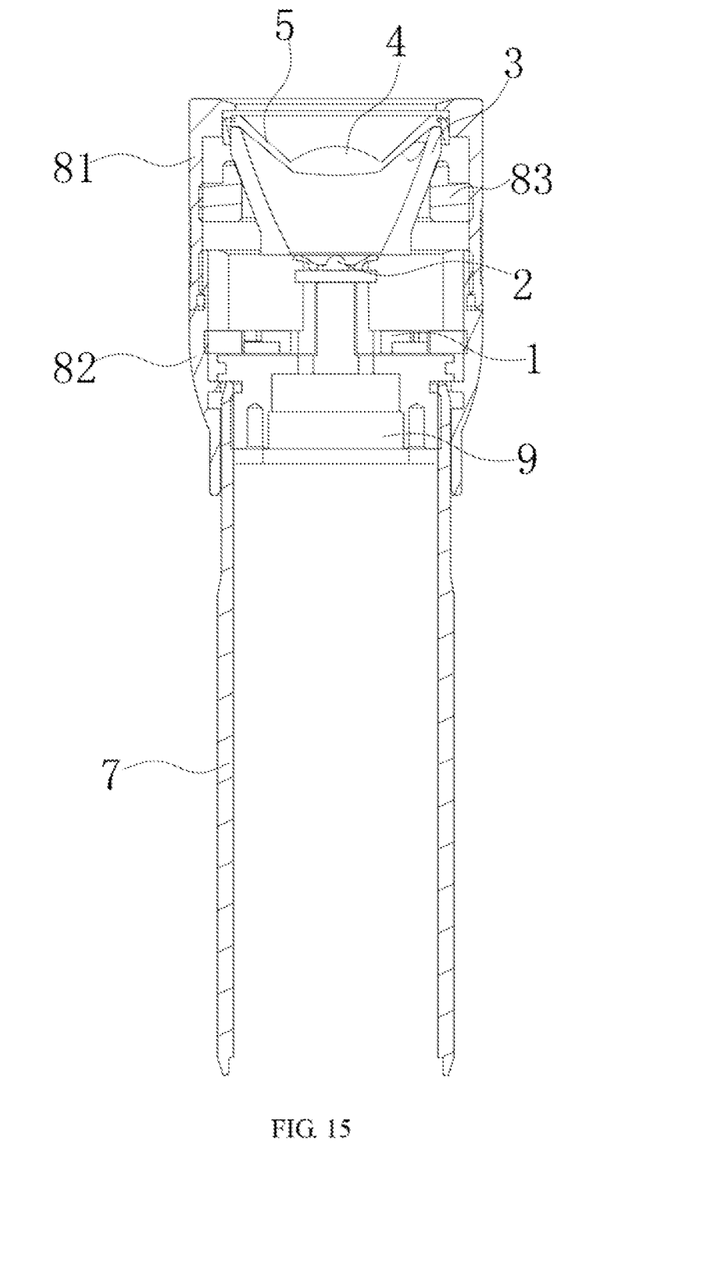
FIG. 15 is the sectional view of the torch shown in FIG. 13.

The optical package above can reduce light loss effectively and be applied in many optical devices such as torches, headlights, bicycle lights, tactical flashes, medical lamps, motor vehicle lamps, airplane illumination lamps and other portable lamps. FIGS. 13, 14 and 15 show a torch having the optical package above, including an optical package shown in FIG. 1, a light holder 7 and a sleeve head part 8, wherein the sleeve head part 8 includes a sleeve head cover 81 at its front end and a sleeve head socket 82 bolt connected with the back end of the sleeve head cover 81, and the sleeve head 8 part can slide along the axis of the light holder 7 relatively to the light holder 7. The mirror 3 and convex lens 4 on the optical package are fixed inside the sleeve head cover 81 through a ring 83. The installation socket 1 is fixed and connected at the front end of the light holder 7. The sleeve head cover 81 leads the mirror 3 and convex lens 4 to slide relatively to the light holder 7, thus changing the relative distance between the light source 2 and the convex lens 4 & mirror 3.

The inner wall of the sleeve head socket 82 above is provided with 2 limit sliding grooves 84 along the axial direction, wherein the inner side ends of the two limit sliding grooves 84 are dead ends. Two elastic connecting sections 14 extend from the circumference of the installation socket 1, wherein two limit flanges 12 are configured at the circumferences of the free ends of the two elastic connecting sections 14 respectively, an elastic limit block 13 is configured between the inner side of the connecting section 11 and the installation socket 1, and the two limit flanges 12 match with the two limit sliding grooves 84 respectively.

As further shown in FIG. 14, if the light source 2 uses an LED light, a heat emitting socket 9 is fixed at the inner side of the installation socket 1 in order to emit the heat generated by the LED light in time.

Figure 16:
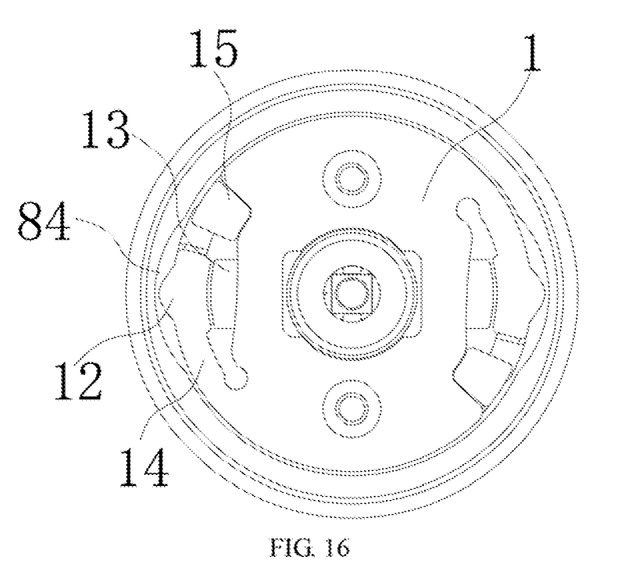
FIG. 16 is the schematic diagram of a using state of the torch shown in FIG. 15.
Figure 17:
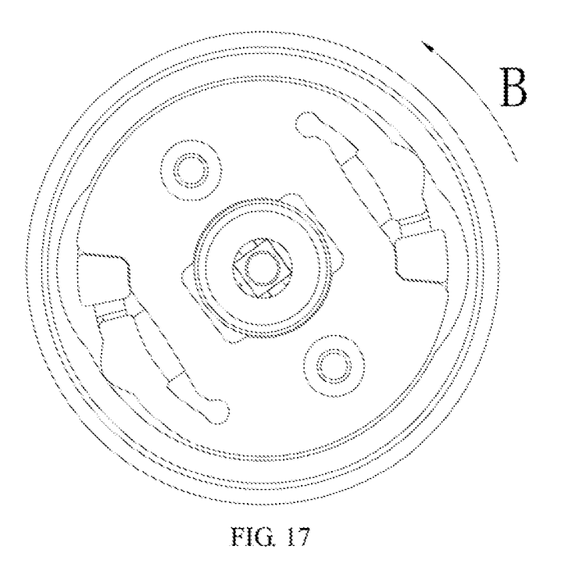
FIG. 17 is the schematic diagram of another using state of the torch shown in FIG. 16.

As shown in FIG. 16, in the initial state, the limit flanges 12 are in the limit sliding grooves 84 and the sleeve head part 8 can move relative to the light holder 7 in the axial direction of the light holder 7, thus changing the relative distance between the light source 2 and the convex lens 4 & mirror 3. As shown in FIG. 17, when the sleeve head part 8 is turned along direction B, the mismatch between the limit sliding grooves 84 and the limit flanges 12 occurs, causing the limit flanges 12 to be rolled out from the limit sliding grooves 84. The inner wall of the sleeve head part 8 presses the limit flanges 12 inwards to deform the elastic connecting sections 14 and the elastic limit block 13 at the same time, so a great fraction force is generated between the outer circumference of the limit flanges 12 and the inner wall of the sleeve head part 8, thus fixing the relative positions of the sleeve head part 8 and the installation socket 1, and further fixing the relative positions of the light source and the convex lens 4.

The elastic limit block 13 above has an assistant effect on the elastic connecting sections 14, thus ensuring that the elastic connecting sections 14 will not break down because of over fatigue under the condition of long-term deformation. Moreover, two limit plates 15 corresponding to the free ends of the two elastic connecting sections 14 respectively are configured on the installation socket 1, and more specifically, the free ends of the elastic connecting sections are between the limit plates 15 and the main body of the installation socket 1. When the elastic connecting sections 14 are pressed by the inner wall of the sleeve head part 8, their free ends will not rise, thus ensuring the normal locking function of the elastic connecting sections 14.

Figure 18:
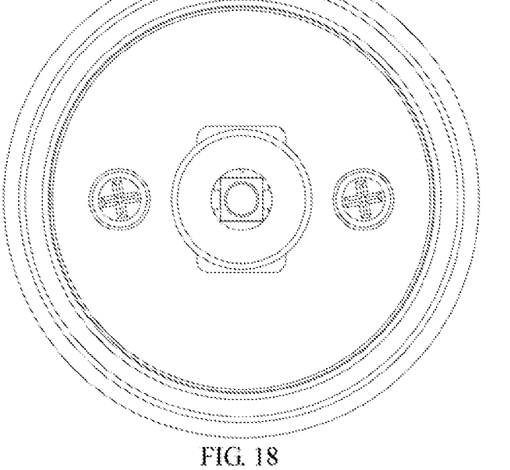
FIG. 18 is the structural diagram of another torch of the present utility model.

As shown in FIG. 18, in order to reduce the cost to adapt to some illumination demands having low requirements, the elastic locking structure above can be omitted with the sleeve head part sleeved at the front end of the light holder directly.

Figure 19:
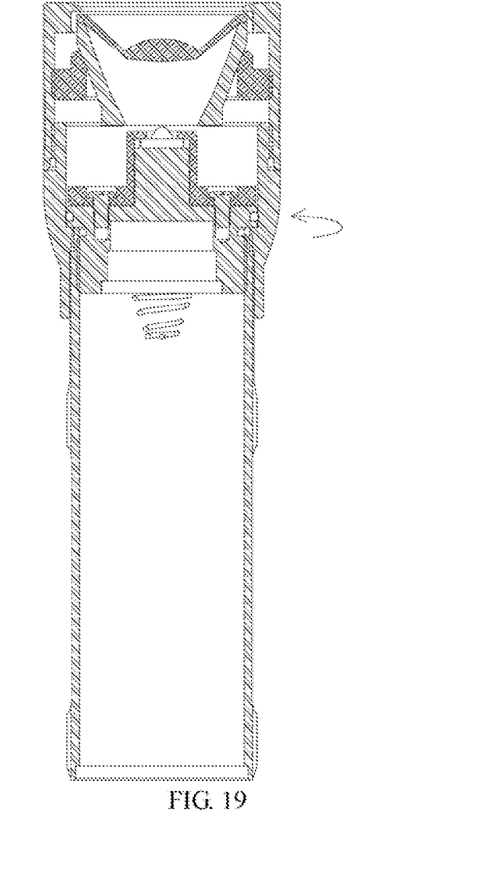
FIG. 19 is the structural diagram of another torch of the present utility model.

As shown in FIG. 19, based on the structure shown in FIG. 18, internal threads and external threads can be configured on the inner surface of the sleeve head part and the outer surface of the light holder at the front end respectively in the present utility model, through which the sleeve head part is bolt-connected at the front end of the light holder. Therefore, when turning the sleeve head part, the axial displacement between the light holder and the sleeve head part can be changed through the mutual matching between the threads, thus the axial displacement between the convex lens & mirror and the light source can be changed.

The convex lens above can be colored and the color can be adjusted according to particular using environments, for example purple can be used to distinguish false from the genuine (such as currency detection), yellow capable of improving penetrating power can be used as vehicle frog lights, the blue convex lens will emit dark black when glaring on red substances and can be used to identify bloodstains at night, since the light-sensitive eye cells are sensitive to the blue-green short wavelength light, it can realize an eye-catching effect when used at night. The red light capable of protecting the night visual function of human eyes effectively is suitable for viewing maps at night.

Figure 20:
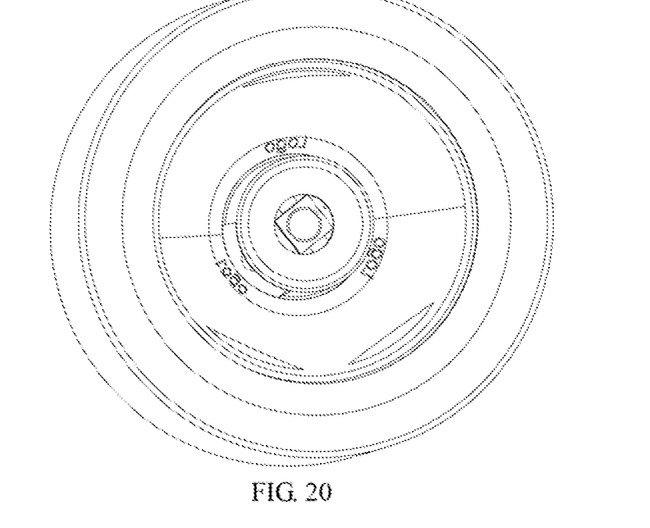
FIG. 20 is the schematic diagram of the torch of the present utility model whose mirror is carved with logo.
Figure 21:
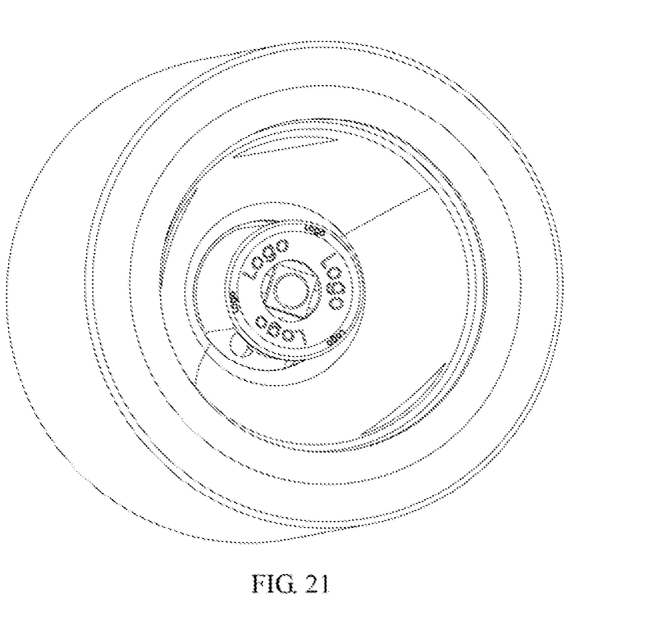
FIG. 21 is the schematic diagram of the torch of the present utility model whose installation depression is carved with logo.

As shown in FIG. 20, inverted characters or brand logos can be carved at the bottom of the reflection surface f1 of the mirror 3 above and the projections of the characters and logos on the cross section of the convex lens 4 shall be ensured to locate on the inner side of the edge of the convex lens 4. In this way, the characters and brand logos can be displayed on the shadow presented by Projection Imaging Principle. It is certain that, as shown in FIG. 21, erected brand logos can also be carved on the reflection surface f2 and the outer end surface of the installation depression 11. In the unused state, the magnified images of the characters and logos can be seen from the front end of the sleeve head part of the torch through the convex lens 4, thus popularizing the product brand.

For the persons skilled in this art, other corresponding alternations and changes can be made based on the technical solutions and ideas above. Any such changes and alternations should be covered in the scope of protection of the Claims of the present utility model.

What is claimed is:

1. An improved optical package, including a light source, an installation socket, a mirror and a convex lens, characterized in that at least one part of the projection of the reflection surface of the mirror on its axial section is in a parabolic shape, the axes of the mirror and the convex lens share the same line, an installation depression is set at the front end of the optical package, wherein the light source is configured in the installation depression, the emitting point of the light source is on the axis of the convex lens and the circumference of the installation depression is formed to be a reflection surface capable of reflecting the light emitted from the bottom of the light source, wherein the installation socket is configured to move relatively to the mirror.

2. The improved optical package according to claim 1, characterized in that the light source is a surface light source, and the focuses of the convex lens and the mirror have a horizontal offset distance no greater than 1 mm.

3. The improved optical package according to claim 1, characterized in that, the reflection surface is a slant, or at least one part of the projection of the reflection surface on the axial section of the mirror is in a parabolic shape.

4. The improved optical package according to claim 1, characterized in that the top of the light source is on the inner side of the outer end surface of the installation depression, or the top of the light source is at the same level with the outer end surface of the installation depression.

5. The improved optical package according to claim 1, characterized in that a light-penetrable support integrated with the convex lens is configured between the outer circumference of the convex lens and the upper end part of the mirror, wherein the support is a plate structure.

6. The improved optical package according to claim 1, characterized in that the positions of the convex lens and the mirror are relatively fixed.

7. An improved optical package, including a light source, an installation socket, a mirror and a convex lens, characterized in that at least one part of the projection of the reflection surface of the mirror on its axial section is in a parabolic shape, the axes of the mirror and the convex lens share the same line, an installation depression is set at the front end of the optical package, wherein the light source is configured in the installation depression, the emitting point of the light source is on the axis of the convex lens and the circumference of the installation depression is formed to be a reflection surface capable of reflecting the light emitted from the bottom of the light source, characterized in that the installation socket can move along the axial direction of the convex lens.

8. The improved optical package according to claim 7, characterized in that the light source is a point light source, the focuses of the convex lens and the mirror coincide with each other, and the emitting point of the light source and the focus of the mirror coincide with each other when the installation socket moves to the maximum space to the convex lens.

9. The improved optical package according to claim 7, characterized in that the light source is an LED light, a through hole fit for the bottom of the LED light is configured at the bottom of the installation depression on the inner side and the axes of the through hole and the convex lens share the same line.

10. The improved optical package according to claim 7, characterized in that a light-penetrable support integrated with the convex lens is configured between the outer circumference of the convex lens and the upper end part of the mirror, characterized in that, the upper and/or lower surfaces of the support are/is in an arc shape.

11. The improved optical package according to claim 7, characterized in that a light-penetrable support integrated with the convex lens is configured between the outer circumference of the convex lens and the upper end part of the mirror, characterized in that a light-penetrable connection plate is integrated between the circumference of the convex lens and the support.

12. The improved optical package according to claim 7, characterized in that a light-penetrable support integrated with the convex lens is configured between the outer circumference of the convex lens and the upper end part of the mirror, characterized in that the support is a conical canister, the angle between the two sides of its cross section is greater 85 degrees and the angle between the extending direction of the support and the cross section of the convex lens is 30-50 degrees.

13. The improved optical package according to claim 7, characterized in that a light-penetrable support canister integrated with the convex lens is configured between the outer circumference of the convex lens and the lower end part of the mirror.

14. The improved package according to claim 7, characterized in that the reflection surface of the mirror has a step and the projections of the reflection surface on the section in the axis of the mirror on the two sides of the step are in a parabolic shape.

15. The improved optical package according to claim 7, characterized in that the light incident surface of the convex lens is a Fresnel surface.

16. The improved optical package according to claim 7, characterized in that the convex lens can move relative to the mirror along its axis.

17. A torch having an optical package including a light source, an installation socket, a mirror, a convex lens, a light holder and a sleeve head part, characterized in that at least one part of the projection of the reflection surface of the mirror on its axial section is in a parabolic shape, the axes of mirrors and the convex lens share the same line, the installation socket can move along the axial direction of the convex lens and an installation depression is set at the front end of the optical package, the light source is configured in the installation depression, the emitting point of the light source is on the axis of the convex lens and the edge of the installation depression is formed to be a reflection surface capable of reflecting the light emitted from the bottom of the light source.

18. The torch according to claim 17, characterized in that the sleeve head part is sleeved at the front end of the light holder and can slide along the axial direction of the light holder, the mirror and the convex lens are installed inside the sleeve head part and the installation socket is fixed and connected with the front end of the light holder, a limit sliding groove is configured on the inner surface of the sleeve head along its axial direction, wherein the inner side of the limit sliding groove is a dead end and an elastic fastener fit for the position-limiting sliding groove is configured at the circumference of the installation socket, wherein the edge of the installation depression corresponds to the circumference of the installation depression.

19. The torch according to claim 18, characterized in that the elastic fastener includes an elastic connection section extending from the edge of the installation socket, and a limit flange integrated at the outer edge of the free end of the elastic connection section, wherein an elastic limit block is set between the elastic connection section and the installation socket.

20. The torch according to claim 19, characterized in that a limit plate is mounted on the installation socket and the free end of the elastic connection section is limited between the limit block and the main body of the installation socket.

21. The torch according to claim 17, wherein the outer surface of the light holder is provided with external threads at the front end, and the inner surface of the sleeve head part is provided with internal threads fit for the external threads, wherein the mirror and the convex lens are mounted in the sleeve head part and the installation socket is fixed and connected with the front end of the light holder.

* * * * *